US005971030A

United States Patent [19]

Maimets

[11] Patent Number: 5,971,030

[45] Date of Patent: Oct. 26, 1999

[54] APPARATUS AND METHOD FOR REPAIRING PRESSURE PIPES AND FOR SECURING OTHER ELEMENTS WITH A CURABLE SEALANT

[76] Inventor: Lembit Maimets, 27 West Beaver Creek Road, Unit #2, Richmond Hill, Ontario, Canada, L4B 1M8

[21] Appl. No.: 08/870,453

[22] Filed: Jun. 6, 1997

[51] Int. Cl.[6] .................... F16L 55/162

[52] U.S. Cl. .................... 138/98; 138/148; 138/149

[58] Field of Search .................... 138/97, 98, 148, 138/149

[56] References Cited

U.S. PATENT DOCUMENTS

| | | | |
|---|---|---|---|
| 3,283,787 | 11/1966 | Davis | 138/148 |
| 3,996,654 | 12/1976 | Johnson | 138/149 |
| 4,318,427 | 3/1982 | Cross, Jr. | 138/149 |
| 4,348,243 | 9/1982 | Craubner | 138/149 |
| 4,744,842 | 5/1988 | Webster et al. | 138/149 |
| 4,768,562 | 9/1988 | Strand | 138/98 |
| 4,976,290 | 12/1990 | Gelin et al. | 138/98 |
| 5,042,532 | 8/1991 | Gilleland | 138/98 |
| 5,077,107 | 12/1991 | Kaneda et al. | 138/98 |
| 5,225,121 | 7/1993 | Yokoshima | 138/97 |
| 5,606,997 | 3/1997 | Blackmore et al. | 138/97 |
| 5,762,450 | 6/1998 | Schmager | 138/97 |
| 5,765,598 | 6/1998 | Goddard et al. | 138/116 |

FOREIGN PATENT DOCUMENTS

| | | |
|---|---|---|
| 2186253 | 8/1987 | United Kingdom . |
| WO90/05267 | 5/1990 | WIPO . |

*Primary Examiner*—James F. Hook

*Attorney, Agent, or Firm*—Greenblum & Bernstein, P.L.C.

[57] ABSTRACT

An apparatus and method primarily intended for repairing pipes and conduits, particularly high-pressure pipes and conduits, such as a watermain. To prevent the creation of a gap between a repair sleeve and the inside of a host pipe, when an epoxy or other curable sealant is used, due to the slight rebound that occurs during the locking of the edges of the sleeve, a bubble gasket or a quantity of loose bubbles is used. During such rebound and locking of the edges of the repair sleeve, the bubbles maintain a force against the sealant as the sealant cures. Although conduit repair is an intended specific application of the invention, the apparatus and method of the invention has broader applicability and are contemplated to encompass the securing of a curable sealant to a surface and the general bonding of two surfaces together.

38 Claims, 8 Drawing Sheets

APPARATUS AND METHOD FOR REPAIRING PRESSURE PIPES AND FOR SECURING OTHER ELEMENTS WITH A CURABLE SEALANT

CROSS-REFERENCE TO RELATED PATENTS

This application hereby incorporates by reference in their entireties the disclosures of the following two United States patents: U.S. Pat. Nos. 5,119,862, issued on Jun. 9, 1992, and 5,351,720, issued on Oct. 4, 1994.

BACKGROUND OF THE INVENTION

1. Field of the Invention

The present invention relates primarily to an apparatus and method for repairing pipes and conduits, particularly relatively high-pressure pipes and conduits, such as a watermain. More particularly, the invention is directed to an internal repair of a section of damaged, weakened, or leaking pipe or conduit, in which the section to be repaired is typically located in an inaccessible area, such as underground. Although conduit repair is an intended specific application of the invention, the apparatus and method disclosed has broader applicability and are contemplated to encompass the securing of a curable sealant to a surface and the general bonding of two surfaces together.

2. Description of Background and Relevant Information

Conduit systems for conveying water are typically located underground and, in general, are not easily accessible if repair or other maintenance is required after installation. Over a period of time, such conduit systems can become damaged, weakened, or can otherwise begin to leak, particularly at the joints between adjacent conduit sections, but also longitudinally along a conduit section.

Problems associated with such systems, and a number of previous repair methods and apparatuses are disclosed, for example, in U.S. Pat. Nos. 5,119,862 and 5,351,720. These patents, which disclose "No-Dig" or non-excavation repairs, utilize a sleeve or liner which is transported to the site of the weakened or damaged pipe in a coiled or partially coiled configuration. Once the repair liner is located in the necessary position at the site of the repair, internal pressure is applied to the sleeve by means of an inflatable bladder or other means, which causes the sleeve to begin to uncoil and expand in the direction of the "host" pipe to be repaired. The sleeve, which includes a gasket or sealing compound on its outer surface, reaches a slight over-expanded condition, whereby the liner compresses the gasket or sealing compound against the inner surface of the host pipe. The internal pressure is then reduced or removed and the sleeve is slightly recoiled, whereby overlapping edges of the sleeve become locked in place by virtue of complementary locking means.

The methods and apparatus disclosed in the aforementioned patents are intended primarily for the repair of conduits that carry wastewater and other fluids that are not in an over-pressure environment. However, a high-pressure pipe, such as a watermain, also requires periodic repair, particularly for sealing against ex-filtration, i.e., against a leak of liquid from the inside to the outside of the pipe. In addition, old leaded joints must be isolated to prevent the leaching of lead into drinking water.

The methods and apparatus disclosed in the aforementioned patents are useful for the repair of high-pressure pipes, although a particular problem, explained below, is posed. Reference will be made to FIGS. 1A, 1B, and 1C in explaining this problem. FIGS. 1A–1C are similar to FIGS. 3A–3C of U.S. Pat. No. 5,119,862, but illustrate the problem created when a sealant suitable for over-pressure pipe repair is used. The size of these pipes is typically between 4 inches and 36 inches in diameter or even greater.

Unlike an elastic compressible gasket or a polyurethane foam, e.g., which are usable for the repairs described in U.S. Pat. No. 5,351,720, high-pressure or over-pressure pipes and conduits require sealants that cure into a concrete-like hardness and which are not compressible. Such resins, unlike compressible or foam sealants, do not expand as they cure. Instead, they more or less retain their initial liquid volume. Although epoxy sealants are contemplated, polyester sealants, for example, are contemplated for conduits that convey potable water.

FIG. 1A schematically illustrates a portion of a coiled repair sleeve 10, which is coiled within a damaged or leaking host pipe 11 prior to or shortly after internal expansion or uncoiling of the repair sleeve has begun, by means of apparatus known in the art, such as an inflatable air bag. The outer surface of the sleeve carries a layer of curable resin 12, such as an epoxy or epoxy-like resin. One edge of the sleeve 10 constitutes a male locking member 13 which is to be inserted into the female member 14 formed at an opposite edge of the sleeve to thereby lock the sleeve in place to effect the necessary repair.

As the air bag or other internal expansion means continues to uncoil the sleeve 10, the sleeve exerts pressure against the inside of the host pipe 11 and squeezes the resin 12 between the sleeve and the host pipe, as shown in FIG. 1B. In addition, the male locking member 13 slides over the internal lower lip 15 of the female locking member 14 until the male locking member is forced beyond the end of the lower lip 15.

As the air bag is then deflated, or other internal expansion means is de-activated, the sleeve 10 coils, due to its spring-like property, or due to the use of a compressible gasket or due to the back pressure of limit straps placed around the coil prior to expansion thereof, so that the male locking member 13 forces itself into the female locking member 14, above the lower lip 15, so that the sleeve assumes its locked position. This locked position is shown in FIG. 1C.

After the layer of resin cures and hardens, however, a gap G is created since the layer of resin tends to retain its previous thickness conferred by the over-expanded condition in FIG. 1B.

Following the repair, when water or fluid pressure is then applied within the host pipe 11, the air gap G prevents resistance to expansion of the sleeve 10. Damage or unlocking of the sleeve can possibly result.

SUMMARY OF THE INVENTION

An object of the present invention is to provide for an apparatus and method for repairing high or over-pressure pipes and conduits, particularly high or over-pressure pipes and conduits, when an epoxy or other curable, non-expansible sealant is utilized in the repair.

More particularly, an object of the invention is to provide for the repair of pipes and conduits with a sleeve or liner that is self-locking according to known methods, per se, but which prevents the creation of a gap between the repair sleeve and the host pipe.

According to a specific embodiment of the invention, a so-called bubble gasket is placed upon the sleeve together with the sealant. Thus, when the sleeve is expanded against the inside of the host pipe, compressed air bubbles are created, the pressure of which is transferred to the sealant. The pressurized sealant is then forced against both the sleeve and the host pipe, thereby flowing to fill any empty space and to prevent the creation of a gap between the sleeve and the host pipe. That is, even after the internal pressure is removed from the interior of the repair sleeve, prior to the sleeve assuming its locked position, the pressure of the air bubbles is maintained so that the sealant/bubble assembly completely fills the annular space between the sleeve and the host pipe.

According to an alternative embodiment, instead of a bubble gasket, loose flexible air bubbles, made of polyethylene, for example, can be mixed with the sealant.

According to another object of the invention, a provision is made for increasing or for at least maintaining a predetermined strength of the sealant. For this purpose, e.g., a quantity of hard glass spheres or beads can be added to the sealant mixture.

According to another object of the invention, instead of a gasket, loose "bubbles", made of polyethylene, e.g., could be mixed into a quantity of the sealant and the mixture could then be applied to the outer surface of the sleeve for repair by means of the expansion and locking of the sleeve as described above.

According to yet a further object of the invention, if damage to the host pipe is at a location other than, e.g., a joint between pipe joints, such as a longitudinal crack which might negatively affect the integrity of the pipe, one or more thin liners can be installed prior to the aforementioned repair.

According to another object of the invention, in the environment of watermains conveying potable water, the repair sleeve according to the invention can be installed over joints of conduit sections, where such conduit systems are of the type which had been installed with leaded joints, in order to isolate such joints and prevent lead from leaching into the water.

According to another object of the invention, an arrangement is provided for transporting the repair sleeve rapidly without damage, which is particularly useful for conduit systems which extend several kilometers or miles between access facilities. For this purpose, the repair sleeve assembly is transported in a capsule having an enclosed leading surface.

In addition to the applicability of the invention for pipe repair, the invention encompasses other fields of endeavor as well, whereby a hardenable, curable sealant is used between two members in order to prevent the creation of an air gap between the two members during the curing of the sealant. These members could be curved, comparable to the above-mentioned sleeve and host pipe, planar, or other shape.

With reference to the foregoing objects, the present invention can be defined to include:

- a sleeve having an outer surface and a pair of longitudinal edges and a locking structure to lock the sleeve into a tubular configuration within an inner surface of a host pipe to be repaired;
- a quantity of flexible air bubbles adapted to be applied over the outer surface of the sleeve; and
- a curable sealant adapted to be applied among and over the quantity of air bubbles, the sealant adapted to be pressed by the air bubbles between the outer surface of the sleeve and the inner surface of the host pipe while the sealant is cured.

According to a specific embodiment, the quantity of air bubbles can be comprised by a bubble gasket. The bubble gasket can comprise a sheet of polyethylene, one surface of the sheet having a plurality of air bubbles projecting therefrom. Alternatively, the loose air bubbles can be used.

The curable sealant usable in the invention can comprise an epoxy or a polyester, depending upon the environment in which the invention is to be utilized. Prior to curing, the sealant is preferably in liquid form, having a predetermined viscosity. A thickening agent, if necessary, can be added to control the viscosity of the sealant.

According to a further embodiment, the invention can additionally include a fiber mat or sheet, such as a sheet of fiberglass, adapted to receive the flexible air bubbles thereon, whether the air bubbles are loose or embodied in a bubble gasket, and for being folded over the air bubbles and the sealant for containing same.

According to a still further embodiment, a quantity of a hardening agent adapted to be added to the sealant, the hardening agent possibly comprising glass beads or fragments thereof.

According to yet a further embodiment, at least one pre-repair liner can be secured against the inner surface of the host pipe, within which the air bubbles, sealant, and sleeve are adapted to be secured, particularly if the damage to the host pipe has jeopardized the structural integrity of same.

As mentioned, the invention has broader application, whereby the invention can be defined to include:

- a quantity of curable sealant;
- a quantity of flexible air bubbles, the air bubbles adapted to be added to the sealant to form a sealant/bubble combination; and
- a device to apply pressure against the sealant/bubble combination while the sealant/bubble combination is in contact with the surface, whereby air pressure within the air bubbles is maintained greater than atmospheric, and the curable sealant is secured to the surface.

Lastly, the invention can be defined to include various methods for conduit repair and, more broadly, for securing a sealant to a surface.

BRIEF DESCRIPTION OF THE DRAWINGS

Other characteristics and advantages of the invention will be better understood upon reading the description that follows and with reference to the annexed drawings, in which.

DETAILED DESCRIPTION OF THE PREFERRED EMBODIMENTS

With respect to the drawings, only enough of the construction of the invention has been depicted, to simplify the illustrations, as needed for those of ordinary skill in the art to readily understand the underlying principles and concepts of the present invention.

Figure 1A:
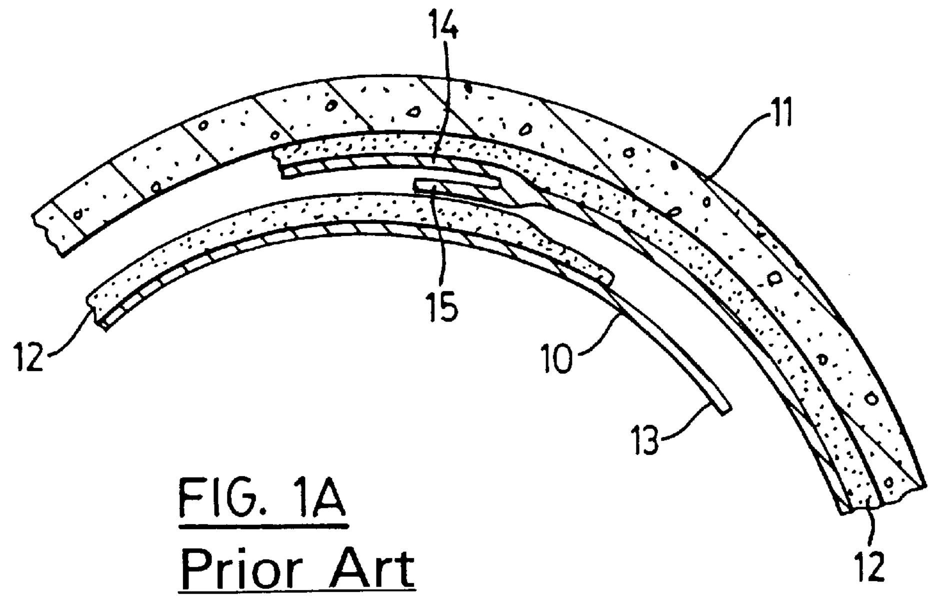
FIG. 1A is a cross-sectional partial view, illustrating a portion of a repair sleeve, coiled within a damaged or leaking host pipe, which does not employ the teachings of the invention, prior to or shortly after internal expansion is begun.
Figure 1B:
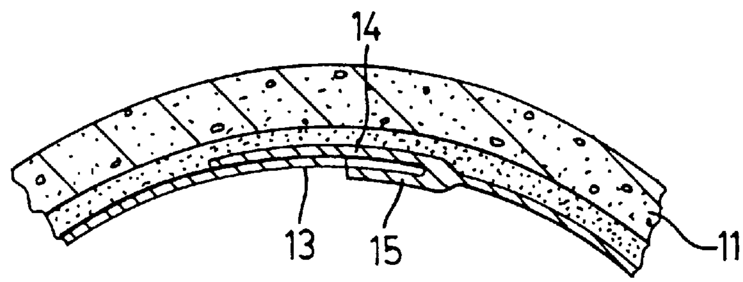
FIG. 1B illustrates the repair sleeve of FIG. 1A in the over-expanded position.
Figure 1C:
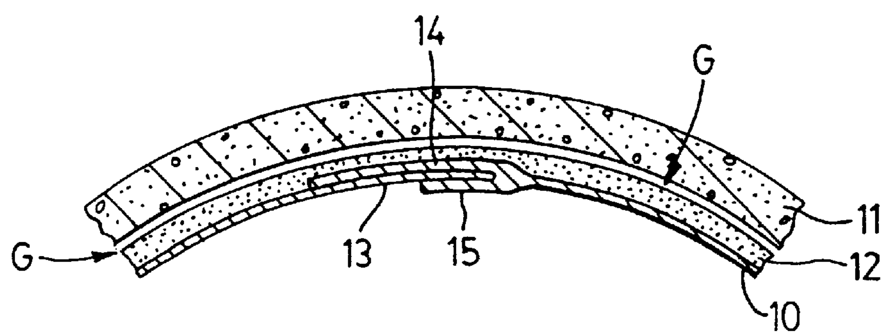
FIG. 1C illustrates the repair sleeve of FIG. 1A in a locked position, in which a gap is created between the sleeve and the host pipe.

Reference is made to FIGS. 1A–1C in the foregoing description of a problem to which the present invention is directed. Attention is now directed to the remaining figures.

Figure 2:
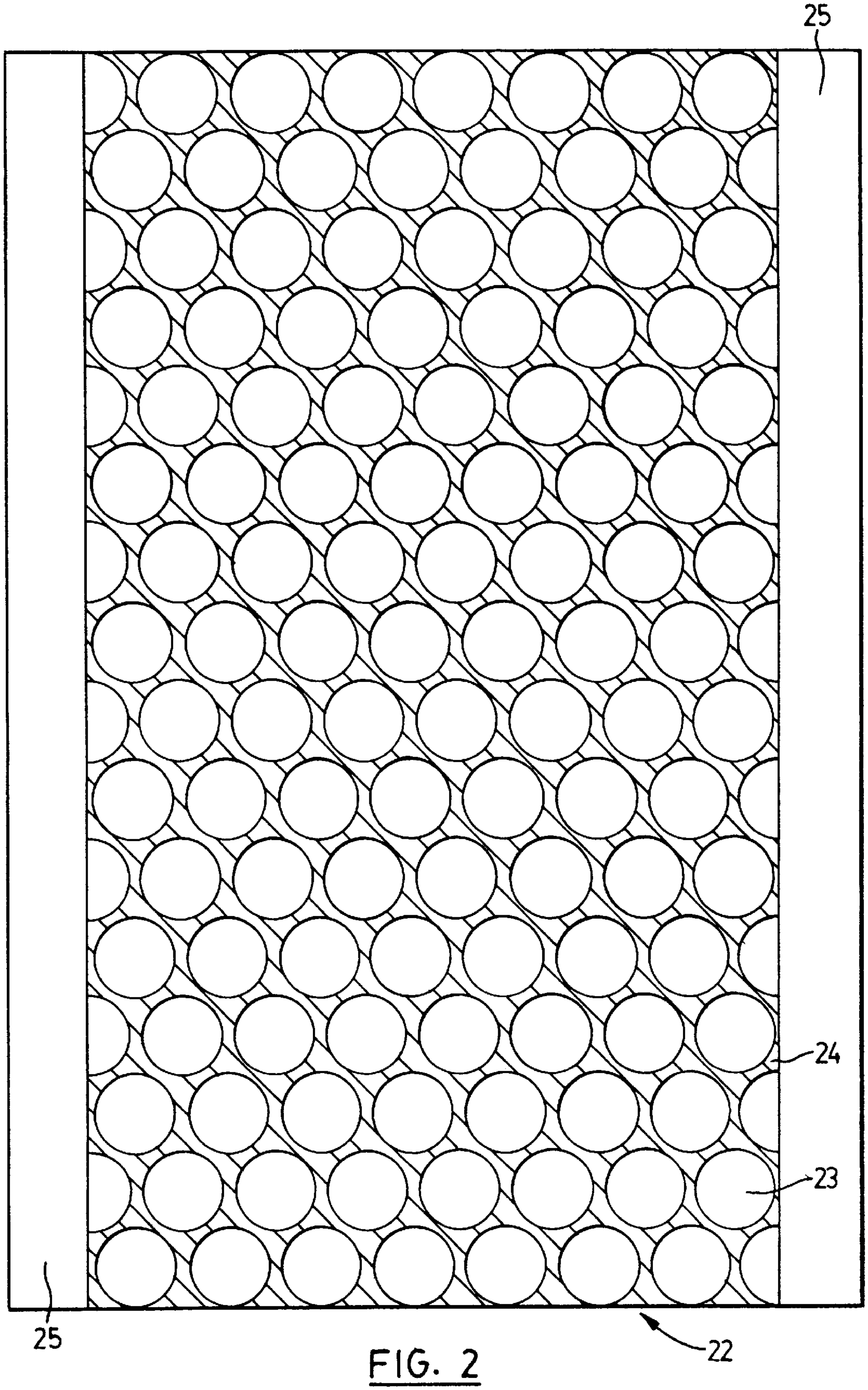
FIG. 2 is a plan view of a bubble gasket according to the invention.

FIG. 2 illustrates, in plan view, a bubble gasket 22 that can be used according to the present invention. The gasket can comprise any of a number of commercially available sheets of material that are known to be used for packaging, whereby one or more such sheets are typically placed around an object which is then placed into a carton, the bubble sheet functioning as a shock-absorbing medium during transport and handling, for example. Such sheets are typically made from thin-walled polyethylene.

One side of the sheet, for example, comprises a planar surface 24 and the bubbles 23 project therefrom. End seals 25 are typically formed at the ends of the sheet. This description and illustration are only exemplary and other forms are also contemplated consistent with achieving the objects of the invention. For example, the bubbles can take various shapes other than the circular or spherical shape shown in FIG. 2. Further, the planar surface 24 at the bases of the bubbles 23 can be minimized or even eliminated, whereby the bases of the bubbles would be contiguous with one another. Further, the number and size of the bubbles can vary, dependent upon the installation. As an example, the bubbles of the bubble gasket can range from approximately ¼ inch (approximately 6.4 millimeters) to approximately one inch (approximately 25.4 millimeters) in diameter, although any size consistent with the objects of the invention are contemplated.

Figure 3:
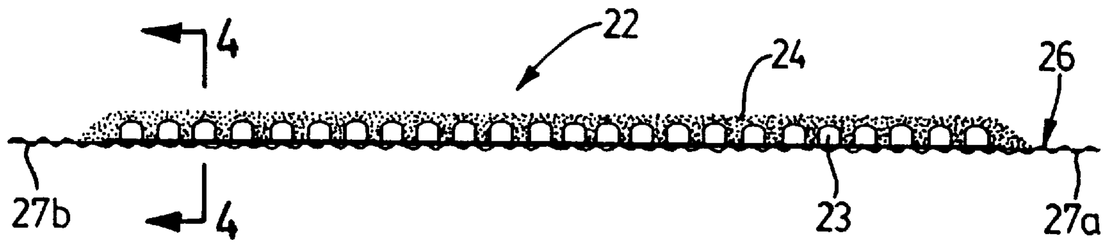
FIG. 3 is a cross-sectional side elevation view illustrating the bubble gasket with a curable resin sealant applied thereon, the gasket being supported upon a sheet of fiberglass.

According to the invention, a liquid curable sealant is applied to the bubble side of the sheet, whereby the liquid flows to the lowest points between and around the bubbles 23, above the surface 24 in the embodiment of FIG. 2 and, finally, the sealant covers the bubbles, as shown in FIG. 3.

Figure 4:
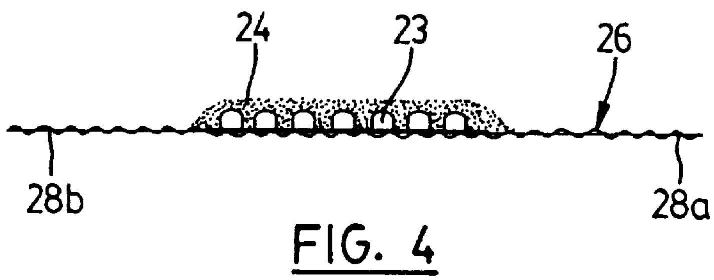
FIG. 4 is a cross-sectional end elevation view taken at line 4—4 of FIG. 3.

The method by which a repair is made is schematically illustrated beginning with FIGS. 3 and 4. First, preferably a fiber mat or sheet of fiberglass 26 is laid flat upon a board or other horizontal surface. The bubble gasket 22 is then laid upon the fiberglass sheet 26, ensuring that each end of the fiberglass sheet has end margins 27*a*, 27*b* and side margins 28*a*, 28*b*.

Figure 5:
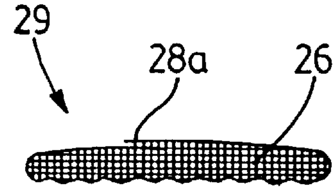
FIG. 5 is an end elevational view of the gasket and sealant, wrapped within the fiberglass sheet.

Next, the bubble gasket 22 is filled with a quantity of a curable resin sealant 24, as shown in FIGS. 3 and 4, the sealant having a viscosity such that it flows substantially like honey or soft butter. If desired, a thickening agent, such as sand or other material can be added to control the flowability of the sealant. After a desired amount of sealant has been applied to the bubble surface of the bubble gasket, i.e., at least an amount sufficient to reach the level of the upper surfaces of the bubbles 23, the ends 27*a*, 27*b* of the fiberglass sheet are folded over the ends of the bubble gasket/sealant and the sides 28*a*, 28*b* of the fiberglass sheet are folded over the sides and the top of the bubble gasket/sealant. As shown in FIG. 5, the bubble gasket and sealant are completely encased by the fiberglass sheet 26, with the side 28*a* overlapping the side 28*b*, to form a bubble gasket/sealant assembly 29.

This covering of the bubble gasket and sealant is intended to facilitate the handling of same as it is applied to the outer surface of the repair sleeve, as explained below. However, it is contemplated that the bubble gasket and sealant can be applied to the sleeve without using the fiberglass or other sheet.

The dimensions of the fiberglass sheet and bubble gasket are shown in the figures merely as exemplary to facilitate an understanding of the invention. Any length and width are contemplated to the extent necessary for the repair to be undertaken, as explained below, and the size of the repair sleeve to be covered. In general, the width of the gasket (see FIG. 4) is sufficient to extend along the repair sleeve to be utilized in the repair, and the length of the gasket (see FIG. 3) is sufficient to extend around the circumference of the locked repair sleeve.

Figure 6:
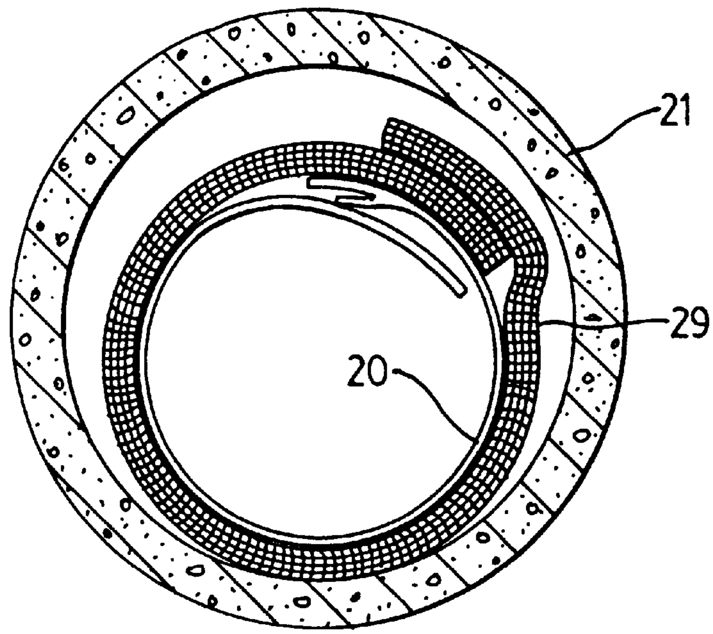
FIG. 6 is a cross-sectional view illustrating a repair sleeve according to the invention, having the fiberglass encased bubble gasket/sealant thereon, prior to expansion against the inside of a host pipe.

Prior to transporting the repair sleeve to the location of a damaged pipe, according to known methods, the bubble gasket/sealant assembly 29, shown in FIG. 5, is wrapped around a coiled repair sleeve. FIG. 6 illustrates, in end elevation, the bubble gasket/sealant assembly 29 wrapped around the repair sleeve 20, within a host pipe 21, the host pipe being shown in transverse cross section. An elastic or other type band or bands (not shown) are preferably used to encircle the bubble gasket/sealant assembly 29 to retain it upon the coiled repair sleeve 20, until the entire assembly/sleeve is transported by known means to the site of the repair. At the site, the band(s) are cut or are otherwise removed.

The host pipe 21 is shown to be concrete, although the invention is suitable for repairing pipes of various compositions. Further, although a sealant or other adhesive material, for example, could be applied to the outer surface of the repair sleeve 20 before the bubble gasket/sealant assembly 29 is wrapped around the repair sleeve, such sealant or material is not found necessary for effecting a repair.

In FIG. 6, the repair sleeve 20 and gasket assembly 29 are shown to be coiled within the host pipe 21 prior to expansion of the sleeve and before the final repair is accomplished. No internal force has yet been applied to the repair sleeve and the locking edges are not yet secured together. The repair sleeve can be made of stainless steel or any suitable material, such as that disclosed in U.S. Pat. Nos. 5,119,862 and 5,351,720, for example, whereby the sleeve is internally tensioned in such a way that it tends to assume the coiled shape shown in FIG. 6.

Figure 7:
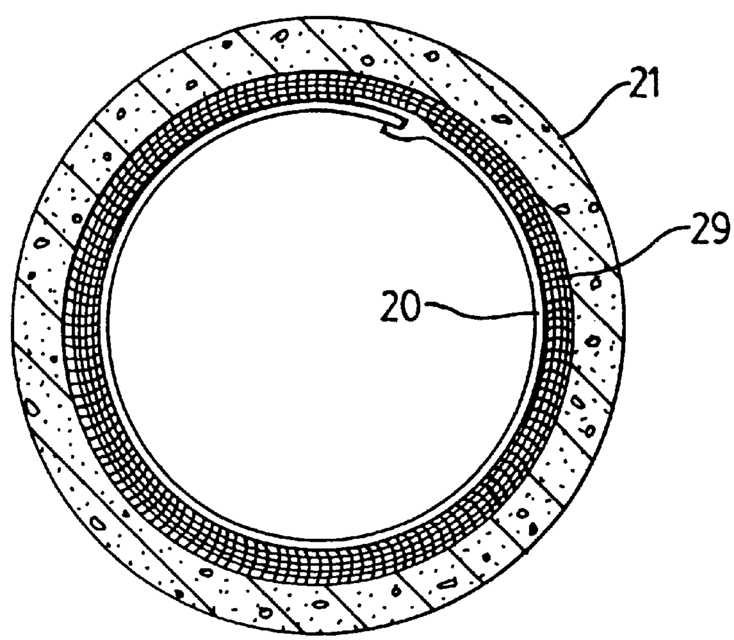
FIG. 7 is a cross-sectional view illustrating the repair sleeve according to the invention in a locked position against the inside of the host pipe, with the sealant cured in place between the sleeve and the host pipe.

FIG. 7 shows the repair sleeve 20 and gasket assembly 29, according to the invention, in a locked position against the inside of the host pipe 21, following expansion and locking of the repair sleeve, with the sealant cured in place between the sleeve and the host pipe, with the bubble gasket applying a radially directed force tending to eliminate any gap between the sealant and the host pipe.

The repair sleeve 20 itself is shown to be similar to that shown in FIGS. 1A, 1B, and 1C, for ease of illustration and understanding. However, it is preferable that the self-actuable locking arrangement be made according to U.S. Pat. No. 5,351,720, in which the projecting members, similar to lower lip 15 in FIG. 1A, are punched from the wall of the repair sleeve and have an effective length of about ⅛ inch (about 3.2 mm).

In addition, the thickness of the bubble gasket/sealant assembly 29 is shown in the drawings to have an exaggerated thickness for ease of illustration and understanding, and its thickness is contemplated to include a thickness less than that shown. In any event, due to compression by the repair sleeve 20, its thickness in FIG. 7 would be less than that in FIG. 6. Any excess sealant, during compression, can be squeezed out of the fiberglass sheet 26 at opposite ends of the sleeve 20. For example, for a 24 inch (about 0.61 centimeter) diameter host pipe, the effective reduction in diameter created by a repair according to the invention is on the order of ⅝ inch (about 1.59 cm).

Figure 8A:
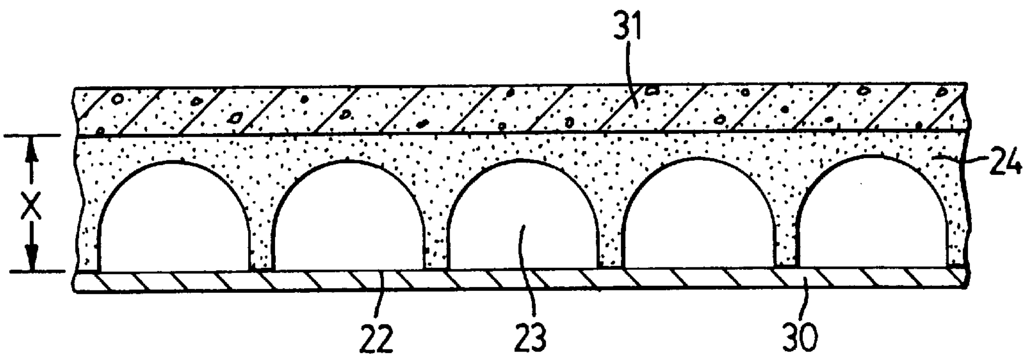
FIG. 8A is a cross-sectional partial view, illustrating a portion of a first plate, such as a repair sleeve; a second plate, such as a damaged or leaking host pipe; and a bubble gasket with a curable sealant between the first and second plates, prior to or shortly after internal expansion has begun, i.e., whereby no or little internal force is applied to the first plate.
Figure 8B:
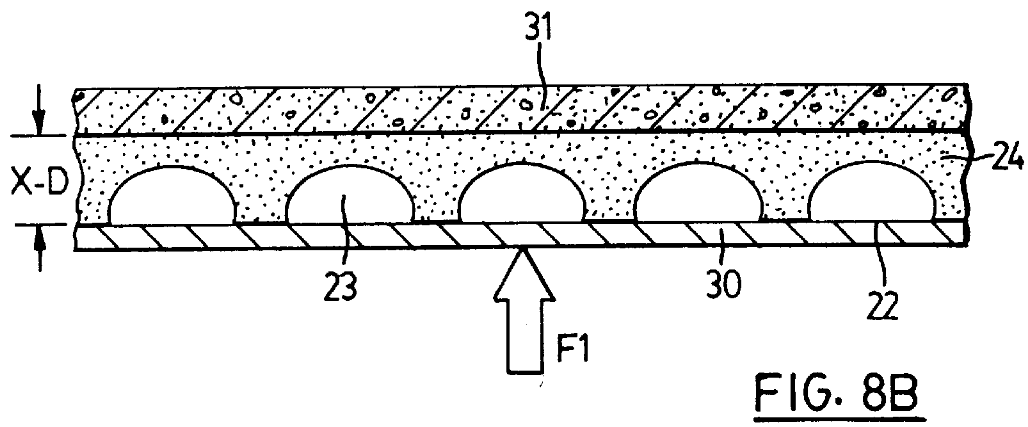
FIG. 8B illustrates the first plate of FIG. 8A in the over-expanded position, whereby the bubble gasket is compressed toward the second plate and the curable sealant is forced into all available interstices between the bubbles of the gasket.
Figure 8C:
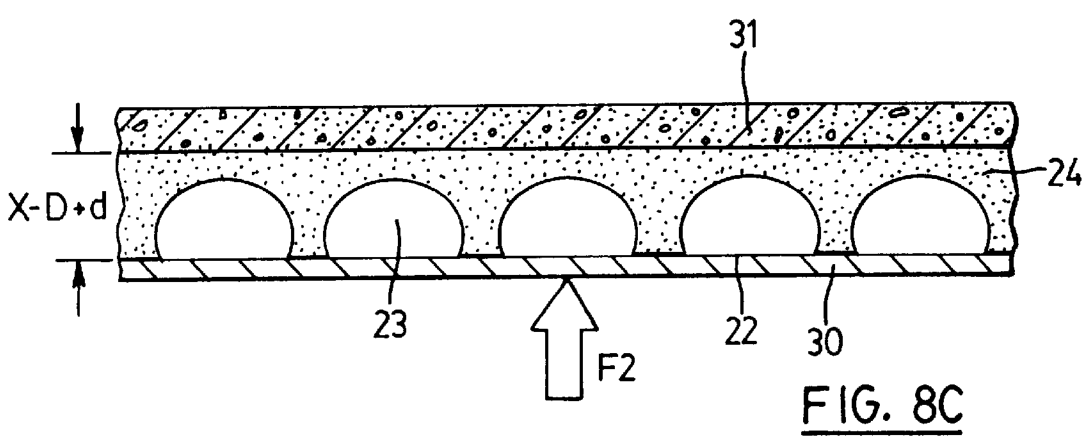
FIG. 8C illustrates the first plate of FIG. 8A in a final position, such as a locked position of a repair sleeve, whereby no gap is created between the first and second plates due to the elasticity of the bubble gasket continuing to exert a force to the sealant toward the second plate.

FIGS. 8A, 8B, and 8C illustrate in greater detail how the bubble gasket functions in the present invention and how it overcomes the problem described above associated with curable sealants. The fiberglass sheet is not shown, for sake of simplicity and understanding.

Further, as mentioned above, inasmuch as the present invention is contemplated to have application to fields of endeavor in addition to that of repairing high pressure conduits, FIGS. 8A–8C illustrate the invention with respect to a pair of spaced plates 30, 31. However, the plates are intended to encompass the specific problem described above in connection with the securing of the repair sleeve 20 and host pipe 21, respectively. For ease of description, therefore, plate 30 will be referred to, below, as the repair sleeve and plate 31 will be referred to as the host pipe.

In each of FIGS. 8A–8C, the repair sleeve 30 is shown to have had applied thereto the bubble gasket 22, with the bubbles 23 extending toward the host pipe 31, with a layer of curable sealant 24 in the interstices between the bubbles 23. The base or carrier sheet of the bubble gasket is very thin and is represented in these figures merely as a darkened line at the uppermost surface of the repair sleeve 30.

In FIG. 8A, the repair sleeve 30 has been expanded to the point where contact with the host pipe 31 has just been made. The sleeve 30 and host pipe 31 are spaced apart a distance X. The air pressure in the bubbles 23 is atmospheric or substantially atmospheric.

In FIG. 8B, the repair sleeve has been expanded to its maximum position by application of force F1 so that the male locking member can slide beyond the complementary locking lip of the female member, as described above with respect to FIG. 1B. The separation between the sleeve 30 and the host pipe 31 has been reduced to distance X–D. The air pressure in bubbles 23 has reached a maximum (greater than atmospheric), this air pressure being exerted against the curable sealant 24 and, through the sealant, against the host pipe 31.

Finally, in FIG. 8C, as the internal pressure applied to the repair sleeve has been reduced from F1 to F2, or even eliminated, the edges of the repair sleeve have become locked in place, as described above with respect to FIG. 1C, and the separation between the sleeve 30 and the host pipe 31 has increased slightly, to a distance X–D+d. The air pressure within the bubbles 23 remains higher than atmospheric, whereby pressure continues to be exerted against the sealant 24. That is, when the repair sleeve 30 is allowed a partial rebound, by virtue of its resiliency, air pressure in the bubbles and the liquid phase of the sealant, i.e., the uncured (not-yet-cured) sealant, is forced back into any available space around the bubbles, as long as the sleeve 30 and pipe 31 do not move back to the position where the differential becomes zero, i.e., to the position in which the air pressure in the bubbles becomes equal to atmospheric.

In view of the pressure applied by the bubbles 23, curing of the sealant 24 occurs as the sealant remains under pressure. Consequently, no possibility exists for the creation of a gap G, as described above with respect to FIG. 1C.

When the pipe 31 comes under working pressure throughout its service life, the tightly packed cured sealant transfers this working pressure to the host pipe 31 without allowing the repair sleeve 30 to open. Thus, the seal remains effective through the service life of the repair.

As an alternative to the bubble gasket, the invention also encompasses the addition of individual loose bubbles, made of polyethylene like those of the bubble gasket, for example, into the liquid curable sealant, whereby the sealant/bubble mixture is then applied to the outside of the repair sleeve, such as by troweling the mixture thereon, and the sleeve is brought into the locked repair position, as previously described. Again, although a fiber mat or fiberglass sheet can be used, the invention contemplates the omission of same. As with the bubbles of the bubble gasket, the size of the loose bubbles can vary. However, the preferred range is between about ¼ inch (about 6.4 mm) to ½ inch (about 12.8 mm) diameter.

Figure 9:
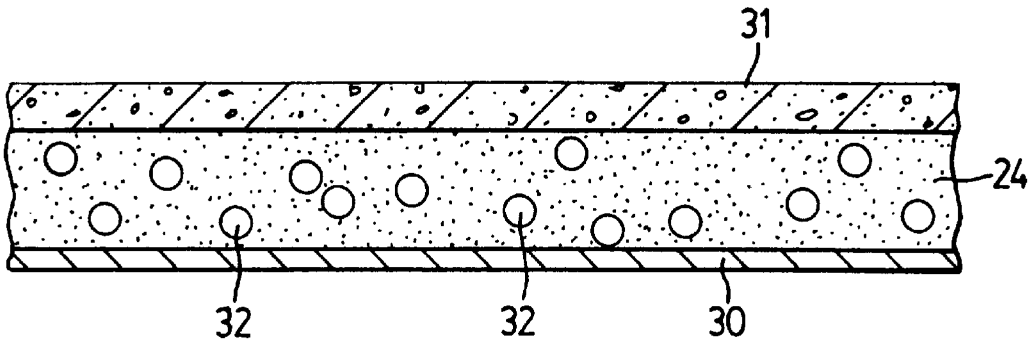
FIG. 9 schematically illustrates, in a view similar to FIG. 8C, an alternative embodiment in which loose bubbles are used.

FIG. 9 schematically illustrates loose bubbles 32 that have been added to the sealant, whereby the repair sleeve 30 and host pipe 31 are shown in their positions shown in FIG. 8C.

It is contemplated that a conventional bubble machine could be used for producing the loose flexible bubbles, whereby liquid polyethylene would be used in place of a typical soap/water bubble solution. A curing agent or other means, such as the application of heat or oil mist, for example, could be used for curing or otherwise treating the sticky polyethylene bubbles prior to their mixture with the sealant.

The air spaces, per se, of the flexible bubbles in the liquid matrix, whether considering loose bubbles or the bubbles of the bubble gasket, do not provide strength. Although a certain strength is maintained due to the honeycomb-like structure achieved around the bubbles after the sealant has cured, the strength of a repair is dependent upon the hardness of the cured liquid sealant. The cured liquid, such as epoxy, various polyesters, etc., for example, become hard to a point of 1500 psi and some can develop a hardness of 15,000 psi and greater.

Further, since introducing the bubble gasket or individual bubbles mixed into the sealant matrix reduces the area of cured matrix which can resist a superimposed load, the resistance to any load is reduced proportionally to the reduction in the area resisting the load. Considering the load in terms of deformation, the fact that the matrix is stressed at a higher level results in proportionally higher deformations being produced. A descriptive example will be referred to for further explaining this point. If the stressed matrix were to be considered to be made up of parallel layers each of which receive a load from an adjacent layer above or below, then each of the layers will undergo deformation in the direction parallel to the applied load. Total deformation in the matrix would be the sum total of all the deformations of the individual layers.

For example, consider the loaded matrix being reduced to 0.25 of its original area by bubbles. The stress in the cured matrix would then be four times higher under the same load. Deformation under this load would also be four times higher.

If every other aforementioned matrix layer were replaced, for example, by glass (or other relatively hard filler material), to a point where the sum thickness of the glass layers is one-half the matrix thickness, then the deformation would be reduced by one-half compared to the deformation of the pure matrix under the same load.

Since glass is on the order of 100 to 200 times stiffer than a curable sealant, deformation of the glass part of the load resistant matrix would be one or two hundredths smaller. Using near enough approximation, glass deformation can be ignored as insignificant, and deformation of the compressed matrix can be considered halved if half of the matrix consists of glass.

For this reason, the invention encompasses, particularly in the embodiment in which individual bubbles are mixed into the liquid sealant matrix, the addition of a hardening agent such as glass beads, spherical or otherwise, or fragments of such beads, thereby achieving a desired stiffness of the matrix with respect to the matrix load resistance. The quantity and ratio of glass beads to air bubbles can be adjusted in dependence upon the desired strength of the repair. The glass beads preferably have a diameter of approximately 1/16 inch to 1/8 inch (i.e., about 1.6 mm to 3.2 mm), although slightly smaller (1/32 inch, e.g.) or larger beads are also contemplated.

Figure 10A:
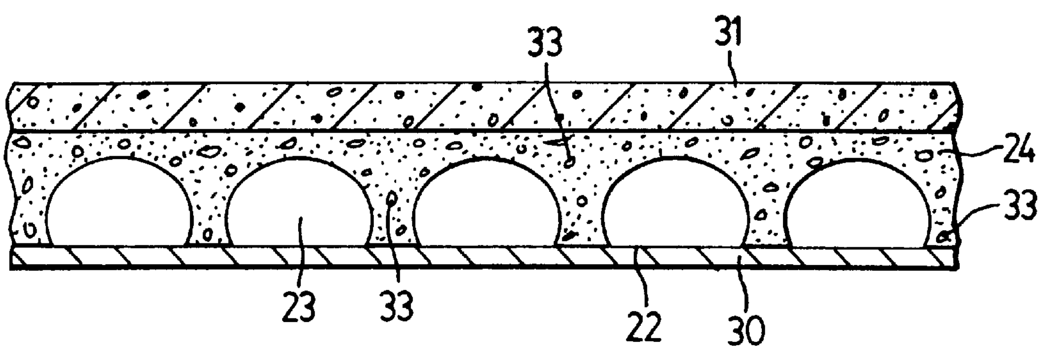
FIG. 10A illustrates an embodiment in which glass beads have been added to the sealant mixture, in an embodiment in which a bubble gasket is used.

FIG. 10A schematically illustrates the presence of glass beads 33 which have been added to the sealant, intermixed with the air bubbles 23 of the bubble gasket, whereby the repair sleeve 30 and host pipe 31 are shown in their positions shown in FIG. 8C, to provide a predetermined hardness between the repair sleeve 30 and the host pipe 31, as explained above. As mentioned, the size and quantity of the glass beads can be varied according to need.

Figure 10B:
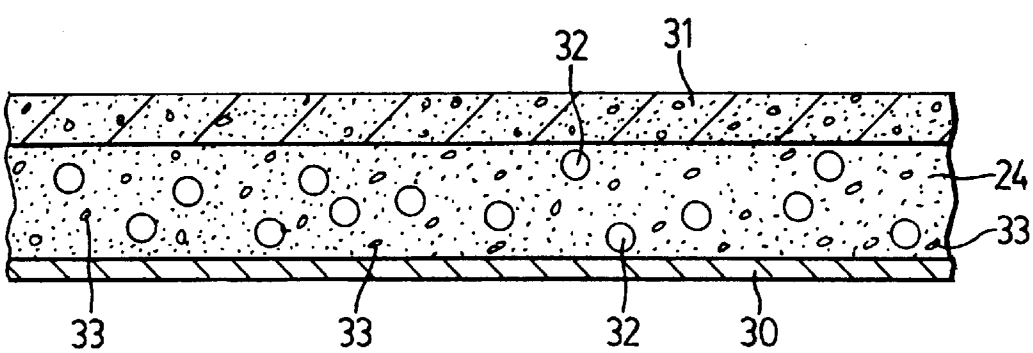
FIG. 10B illustrates an alternative embodiment in which glass beads have been added to the sealant mixture and whereby loose bubbles are used.

FIG. 10B is similar to FIG. 10A, with the exception that loose bubbles 32 are used instead of bubbles of a bubble gasket. This figure shows that the bubbles 32 and glass beads 33 are mere additives to a known resin sealant, each additive have specific characteristics. For example, as mentioned above, the air bubbles provide an air pressure tending to ensure that the resin sealant matrix is forced to fill available space between a pair of opposed surfaces (repair sleeve and host pipe, for example), and the glass beads provide for an increased matrix strength or hardness lost, per cubic unit of measurement, by virtue of the addition of the air bubbles.

Figure 11:
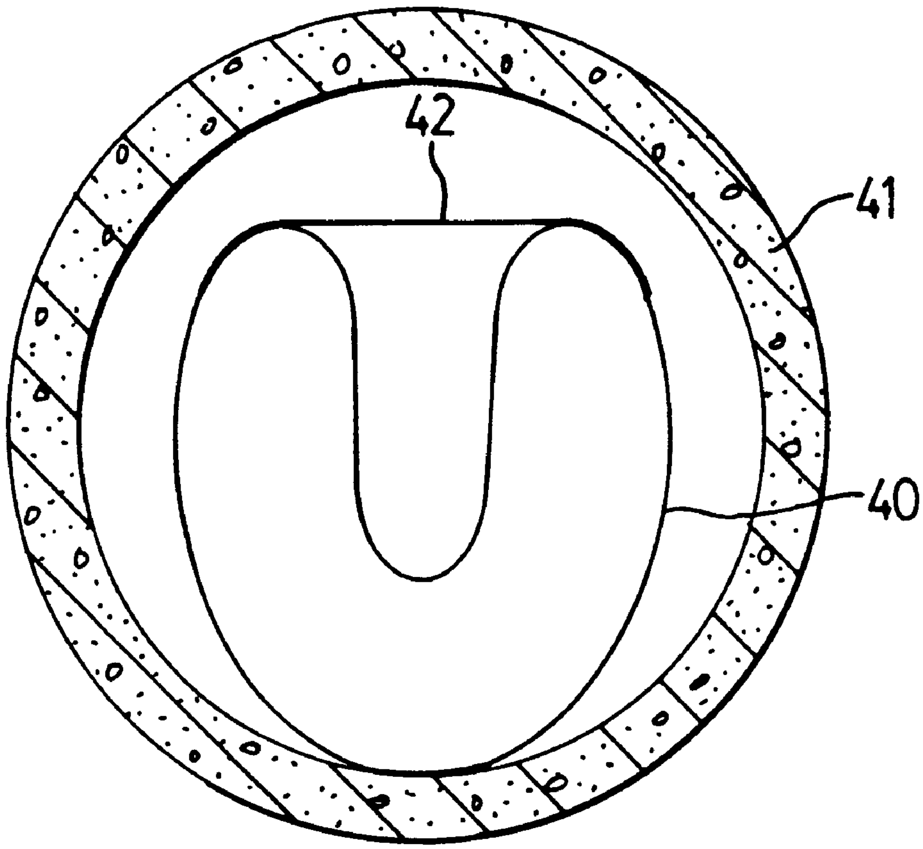
FIG. 11 illustrates pre-repair liner for maintaining the integrity of the host pipe.

Heretofore, it has been assumed that the host pipe, though cracked or leaking, either through a joint or otherwise, is able to maintain its strength or integrity and, therefore, is not in need of strengthening. Most repairs to be made do not require such strengthening of the host pipe. However, FIG. 11 illustrates a pre-repair liner 40 that can be installed within a host pipe 41 in the event the host pipe includes a crack or other damaged area, such as a longitudinally extending fissure, which causes the host pipe to have lost its integrity and for which there would be a risk of rupture or other failure when fluid pressure is resumed following a repair, in spite of the presence of the aforementioned repair sleeve. The liner 40 is intended to be installed immediately adjacent the inner wall of the host pipe 41 and it is intended to provide the integrity or so-called hoop strength of the damaged host pipe. One or several liners 40 can be installed in order to achieve a predetermined strength. It is contemplated that the liner 40 should be a minimum of 26 gauge, or have a minimum thickness of 0.48 millimeters.

Unlike the aforementioned repair sleeve 20, e.g., which includes locking edges, the pre-repair liner 40 is a continuous tubular member, perhaps having a welded or otherwise fused longitudinal seam. Of course, in spite of the continuous periphery of the liner 40, it must be collapsed to some extent so that it can be transported to the location in the conduit system to be repaired. To this end, the liner is shown to have been temporarily flexed into the somewhat U-shape as shown in FIG. 11. A holding member 42, such as a strip of adhesive tape, e.g., such as a corrosion-resistant PVC flexible tape, perhaps fiber-strengthened, e.g., can be used to maintain the liner 40 in the U-shape. Such tape of about 15 mil thickness is considered to be suitable. Alternatively, an elastic band that completely encircles the U-shaped flexed liner 40 could be used. Once the liner 40 is located at the repair site, the holding member 42 is cut or otherwise removed (remotely, by means of a cable attached to a tearable strip on the holding member, for example) so that the liner 40 can spring back into its circular or substantially circular shape against the inner surface of the host pipe 41. Once the liner(s) is secured against the host pipe 41, the repair can then commence, according to the invention described above.

The liner(s) 40 should preferably have a length less or at least slightly less than that of the repair sleeve 20, although each liner should have a length sufficient to cover the entire area of damage of the host pipe and then some distance into the good or undamaged area of the pipe. The repair sleeve 20 would then extend at least slightly beyond the length of the liner(s) 40 so as to seal the ends of the liner(s) 40.

Due to the need to be flexed into the shape shown in FIG. 11, it is contemplated that the liner 40 must be kept thin to avoid exceeding the yield strength of the material from which the liner 40 is made as it is flexed. Otherwise, it will not be able to resume its circular shape after the holding band or tape 42 is removed. Each liner would be secured in place at the site of the damaged host pipe with the use of known resins, e.g., such as polyurethane, which would expand at the surface and into the crevices of the host pipe.

As mentioned above, it is preferred that the locking members of the repair sleeve according to the invention be made according to the teaching of U.S. Pat. No. 5,351,720, in which the projecting male members are punched from the wall of the repair sleeve, near one of the longitudinal edges of the sleeve. For each such member, a small hole is made in the wall of the sleeve. It is conceivable, if such small holes become aligned with an opening, crack, leaking joint, e.g., in the host pipe which is intended to be sealed with the repair sleeve, that only the sealant/bubble assembly to resist the ex-filtration or escape of water or other fluid under pressure. While a repair can nevertheless be effected according to the invention, means can be provided for addressing this potential problem.

Figure 12:
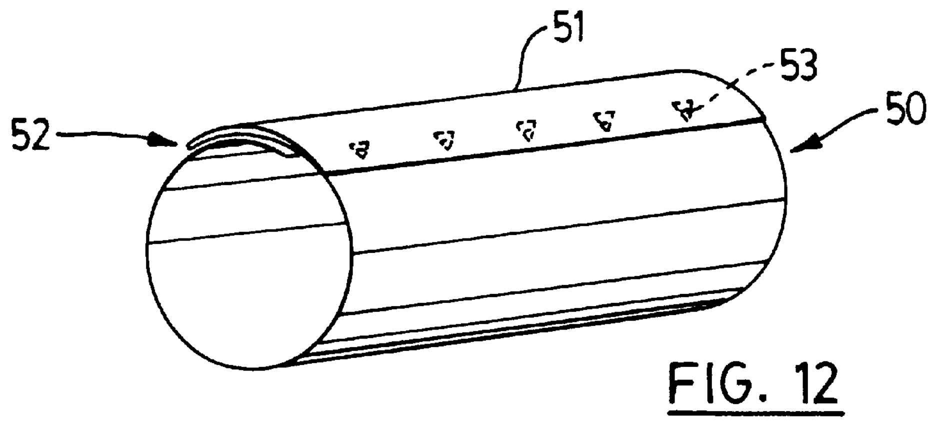
FIG. 12 illustrates a repair sleeve having the exterior longitudinal edge bent back over the locking members.

Specifically, in FIG. 12 a repair sleeve 50 is shown having a longitudinally extending portion 51 bent back at 52 over the row of locking members 53 so that the openings thereof are completely covered.

Figure 13:
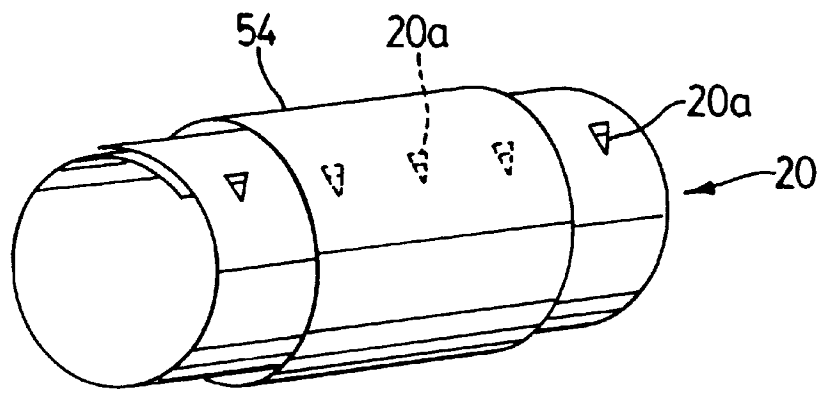
FIG. 13 illustrates a modification of the repair sleeve of FIG. 12, which includes a secondary sleeve positioned exteriorly of the repair sleeve.

Alternatively, as shown in FIG. 13, whereas the repair sleeve 20 can remain unmodified, a secondary sleeve 54 can be positioned to surround the repair sleeve 20. The sealant/bubble assembly can be placed upon or beneath the secondary sleeve 54. In this embodiment, the secondary sleeve 54 would surround at least the central longitudinal portion of the repair sleeve 20 so that the secondary sleeve would cover, at least, the locking members 20*a* and the sealant/bubble assembly in the area of an open joint in the host pipe, for example. The construction of the secondary sleeve 54 could be the same as that of the repair sleeve 20, with the exception of its length, and it would be expanded together with the repair sleeve against the inside of the host pipe. Preferably, however, the secondary sleeve would not include any locking members.

The repair sleeve according to the invention described above can be transported to the site of a repair according to known methods described, for example, in U.S. Pat. No. 5,351,720. These methods are quite acceptable for repairs to sewer systems, for example, that are relatively short in length or in which access facilities are spaced apart by such relatively short distances, for example, up to about 400 to 500 feet (about 122 to 152 meters). For such repairs, the repair sleeve can be moved to the site of the repair relatively slowly. However, for pressure lines such as, for example, natural gas lines, if the distance between access facilities is several kilometers or miles, then it is desirable to increase the speed of transport of the repair sleeve in view of the fact that the resin in the sealant begins to harden over time and in view of the fact that installation costs increase if the time required for completing an installation increases.

Figure 14:
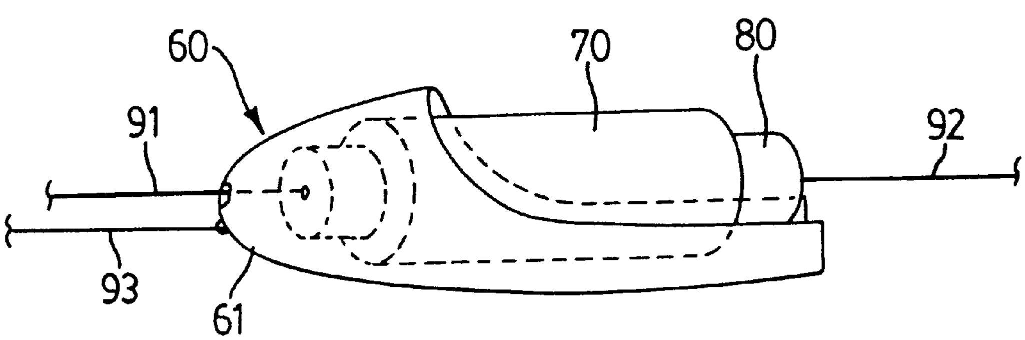
FIG. 14 illustrates a capsule for carrying the repair sleeve at relatively high speeds.

FIG. 14 schematically illustrates a capsule 60 within which the repair sleeve assembly 70, constructed according to any of the embodiments described above, e.g., is positioned, together with an inflatable plug or other expansion or uncoiling device 80. At least the front or leading surface 61 is closed and preferably rounded in order to facilitate high speed transport of same through a lengthy conduit system. Cables 91, 92 are attached to the expansion device and repair sleeve assembly for facilitating movement of same according to known techniques, cable 91 extending through an opening in the capsule, and a additional cable 93 is affixed to the front of the capsule so as to pull it from the assembly once the assembly is brought to the site of the repair.

Although the invention has been described with reference to particular means, materials, and embodiments, it is to be understood that the invention is not limited to the particulars expressly disclosed, but the invention extends to all equivalents within the scope of the claims that follow.

What is claimed is:

1. A conduit repair apparatus comprising:

a sleeve having an outer surface and a pair of longitudinal edges and a locking structure to lock said sleeve into a tubular configuration within an inner surface of a host pipe to be repaired;

a quantity of elastically compressible air bubbles adapted to be applied over said outer surface of said sleeve; and a curable sealant adapted to be applied among and over said quantity of air bubbles, said sealant adapted to be pressed by said air bubbles between said outer surface of said sleeve and the inner surface of the host pipe while said sealant is cured.

2. A conduit repair apparatus according to claim 1, further comprising:

a bubble gasket, said bubble gasket comprising said quantity of air bubbles.

3. A conduit repair apparatus according to claim 2, wherein:

said bubble gasket comprises a sheet of polyethylene, one surface of said sheet having a plurality of air bubbles projecting from said sheet.

4. A conduit repair apparatus according to claim 1, wherein:

said plurality of air bubbles comprise a quantity of loose air bubbles adapted to be combined with said sealant.

5. A conduit repair apparatus according to claim 1, wherein:

said curable sealant comprises an epoxy.

6. A conduit repair apparatus according to claim 1, wherein:

said curable sealant comprises a polyester.

7. A conduit repair apparatus according to claim 1, further comprising:

a fiber sheet adapted to receive said air bubbles thereon and for being folded over said air bubbles and said sealant for containing said air bubbles and said sealant.

8. A conduit repair apparatus according to claim 1, wherein:

said air bubbles are comprised by a sheet of polyethylene having said plurality of air bubbles projecting from said sheet; and the conduit repair apparatus further comprises a fiber sheet adapted to receive said bubble gasket thereon and for being folded over said bubble gasket and said sealant for containing said bubble gasket and said sealant.

9. A conduit repair apparatus according to claim 1, further comprising:

a quantity of a hardening agent adapted to be added to said sealant.

10. A conduit repair apparatus according to claim 9, wherein:

said hardening agent comprises glass beads.

11. A conduit repair apparatus according to claim 1, further comprising:

at least one pre-repair liner adapted to be secured against the inner surface of the host pipe, within which said air bubbles, sealant, and sleeve are adapted to be secured.

12. A conduit repair apparatus according to claim 1, wherein:

said sealant is a liquid having a predetermined viscosity.

13. An apparatus for securing a curable sealant to a surface, said apparatus comprising:

a quantity of curable sealant;

a quantity of flexible air bubbles, said air bubbles adapted to be added to said sealant to form a sealant/bubble combination; and a device to apply pressure against said sealant/bubble combination while said sealant/bubble combination is in contact with said surface, whereby air pressure within said air bubbles is maintained greater than atmospheric, and said curable sealant is secured to said surface.

14. An apparatus according to claim 13, wherein:

said sealant is a liquid having a predetermined viscosity.

15. An apparatus according to claim 13, wherein:

said sealant comprises a non-expansible epoxy or polyester resin.

16. An apparatus according to claim 13, further comprising:

a bubble gasket, said bubble gasket comprising said quantity of air bubbles.

17. An apparatus according to claim 13, wherein:

said quantity of flexible air bubbles comprises a quantity of loose air bubbles adapted to be combined with said sealant.

18. An apparatus according to claim 13, wherein:

said flexible air bubbles are made of polyethylene.

19. An apparatus according to claim 13, wherein:

said surface is an inner surface of a host pipe to be repaired; and said device to apply pressure against said sealant/bubble combination comprises a coiled conduit repair sleeve, said repair sleeve having an outer surface, said sealant/bubble combination being positioned between said repair sleeve and said inner surface of the host pipe to be repaired.

20. A conduit repair method comprising:

combining a curable sealant and a quantity of flexible air bubbles to create a sealant/bubble combination;

applying said sealant/bubble combination to an outer surface of a conduit repair sleeve, said conduit repair sleeve including a pair of longitudinal edges and a locking structure to lock said sleeve into a tubular configuration within an inner surface of a host pipe to be repaired, said conduit repair sleeve assuming a coiled position and being adapted to assume an expanded locked position;

positioning said conduit repair sleeve within the host pipe at a site to be repaired; and expanding said conduit repair sleeve to said expanded locked position, whereby said sealant/bubble combination is positioned between said conduit repair sleeve and the inner surface of the host pipe and air within said flexible air bubbles is maintained at a pressure greater than atmospheric by means of pressure exerted against said flexible air bubbles only by means of said conduit repair sleeve having been expanded.

21. A conduit repair method according to claim 20, wherein:

said quantity of air bubbles is constituted by a bubble gasket; and said combining of a curable sealant and a quantity of air bubbles comprises applying said curable sealant to said bubble gasket.

22. A conduit repair method according to claim 21, wherein:

said bubble gasket comprises a sheet of polyethylene, one surface of said sheet having a plurality of bubbles projecting from said sheet; and said applying said curable sealant to said bubble gasket comprises applying said curable sealant to said one surface of said sheet.

23. A conduit repair method according to claim 20, wherein:

said combining a curable sealant and a quantity of flexible air bubbles comprises combining a curable sealant and a quantity of loose flexible air bubbles.

24. A conduit repair method according to claim 20, wherein:

said curable sealant comprises an epoxy.

25. A conduit repair method according to claim 20, wherein:

said curable sealant comprises a polyester.

26. A conduit repair method according to claim 20, wherein:

said combining a curable sealant and a quantity of air bubbles to create a sealant/bubble combination comprises combining said curable sealant and said air bubbles on a fiber sheet; and prior to said applying said sealant/bubble combination to an outer surface of a conduit repair sleeve, wrapping said fiber sheet around said sealant/bubble combination to enclose said sealant/bubble combination.

27. A conduit repair method according to claim 20, wherein:

said air bubbles are comprised by a sheet of polyethylene having said plurality of air bubbles projecting from said sheet; and said combining a curable sealant and a quantity of air bubbles to create a sealant/bubble combination comprises combining said curable sealant and said air bubbles on a fiber sheet; and prior to said applying said sealant/bubble combination to an outer surface of a conduit repair sleeve, wrapping said fiber sheet around said sealant/bubble combination to enclose said sealant/bubble combination.

28. A conduit repair method according to claim 20, further comprising:

adding a quantity of a hardening agent to said sealant.

29. A conduit repair method according to claim 28, wherein:

said hardening agent comprises glass beads.

30. A conduit repair method according to claim 20, further comprising:

securing at least one pre-repair liner against an inner surface of the host pipe, within which said flexible air bubbles, sealant, and sleeve are secured.

31. A conduit repair method according to claim 20, wherein:

said sealant is a liquid having a predetermined viscosity.

32. A method for securing a curable sealant to a surface, said method comprising:

combining a curable sealant and a quantity of flexible air bubbles to create a sealant/bubble combination;

placing said sealant/bubble combination in contact with said surface and applying pressure against said sealant/ bubble combination while said sealant/bubble combination is in contact with said surface, whereby air pressure within said flexible air bubbles is maintained greater than atmospheric; and maintaining said pressure against said sealant/bubble combination until said curable sealant has cured.

33. A method according to claim 32, wherein:

said sealant is a liquid having a predetermined viscosity.

34. A method according to claim 32, wherein:

said sealant comprises a non-expansible epoxy or polyester resin.

35. A method according to claim 32, wherein:

said quantity of flexible air bubbles are air bubbles of a bubble gasket; and said combining a curable sealant and a quantity of flexible air bubbles comprises placing said sealant on one side of said bubble gasket, whereby said sealant is placed in contact with said flexible air bubbles.

36. A method according to claim 32, wherein:

said combining a curable sealant and a quantity of flexible air bubbles to create a sealant/bubble combination comprises combining a curable sealant and a quantity of loose flexible air bubbles.

37. A method according to claim 32, wherein:

said flexible air bubbles are made of polyethylene.

38. A method according to claim 32, wherein:

said surface is an inner surface of a host pipe to be repaired and said maintaining said pressure against said sealant/bubble combination is performed by force exerted by an outer surface of a repair sleeve.

* * * * *

UNITED STATES PATENT AND TRADEMARK OFFICE

CERTIFICATE OF CORRECTION

PATENT NO. : 5,971,030
DATED : October 26, 1999
INVENTOR(S) : L. Maimets

It is certified that error appears in the above-identified patent and that said Letters Patent is hereby corrected as shown below:

Title page,
Item [56], References Cited, the following U.S. PATENT DOCUMENTS were omitted and should be included:

| | | | |
|---|---|---|---|
| 5,119,862 | 6/1992 | Maimets et al. | 138/98 |
| 5,351,720 | 10/1994 | Maimets | 138/98 |

Signed and Sealed this

Eighteenth Day of September, 2001

*Attest:*

Nicholas P. Godici

NICHOLAS P. GODICI

*Attesting Officer* *Acting Director of the United States Patent and Trademark Office*